United States Patent [19]
Chen et al.

[11] Patent Number: 5,891,940
[45] Date of Patent: Apr. 6, 1999

[54] SYNDIOTACTIC POLYPROPYLENE RESIN COMPOSITION

[75] Inventors: Pingfan Chen; Ichiro Fujio, both of Takaishi, Japan

[73] Assignee: Mitsui Chemicals, Inc., Tokyo, Japan

[21] Appl. No.: 979,844

[22] Filed: Nov. 26, 1997

Related U.S. Application Data

[63] Continuation of Ser. No. 582,396, Jan. 3, 1996, abandoned.

[30] Foreign Application Priority Data

Jan. 13, 1995 [JP] Japan ................................ 7-003800
Jun. 19, 1995 [JP] Japan ................................ 7-151277

[51] Int. Cl.$^6$ ........................................................ C08K 5/20
[52] U.S. Cl. ........................................... 524/229; 524/232
[58] Field of Search ................................. 524/289, 232

[56] References Cited

U.S. PATENT DOCUMENTS 5,298,549  3/1994  Mecklenburg .......................... 524/445

FOREIGN PATENT DOCUMENTS 0213788  3/1987  European Pat. Off. .
0466926  1/1992  European Pat. Off. .
3153793  7/1991  Japan .
6220268  8/1994  Japan .

OTHER PUBLICATIONS

Database WPI, Derwent Publication Ltd., London, GB; AN 94–291028 & JP–a–06220268 (Kyoeisha), Aug. 9, 1994 *Abstract*.

*Primary Examiner*—Peter D. Mulcahy
*Attorney, Agent, or Firm*—Burns, Doane, Swecker & Mathis, L.L.P.

[57] ABSTRACT

The present invention provides a syndiotactic polypropylene resin composition of excellent moldability comprising 100 parts by weight of a syndiotactic polypropylene and 0.001–10 parts by weight of a diamine/monocarboxylic acid condensate and/or a diamine/monocarboxylic acid/polybasic acid polycondensate. The composition has excellent moldability, particularly, excellent releasability from mold in injection molding; excellent transparency; and good balanced mechanical properties.

7 Claims, No Drawings

SYNDIOTACTIC POLYPROPYLENE RESIN COMPOSITION

This application is a continuation of application Ser. No. 08/582,396, filed Jan. 3, 1996 now abandoned.

BACKGROUND OF THE INVENTION (a) Field of the Invention

The present invention relates to a syndiotactic polypropylene resin composition. More particularly, the present invention relates to a syndiotactic polypropylene resin composition having excellent moldability (e.g. excellent fluidity and mold releasability), good optical properties (e.g. good transparency and gloss) and good mechanical properties (e.g. good rigidity and impact resistance).

(b) Description of the Prior Art

Syndiotactic polypropylene has excellent transparency, impact resistance, electrical properties, etc. but has a problem of low hardening rate, that consequently causes poor moldability (particularly, poor injection moldability).

The hardening rate of crystalline polypropylene can be increased by, for example, addition of a nucleating agent. When there is added to crystalline polypropylene a known nucleating agent [typical examples thereof are organic nucleating agents such as aromatic carboxylic acid metal salt (e.g. GBA), sorbitol derivative (e.g. Gelall MD), organic phosphoric acid salt (e.g. NA-21) and the like and inorganic nucleating agents such as talc and the like], an increased crystallization rate is obtained and, in the case of isotactic polypropylene, improved transparency is obtained in many cases but the transparency is not sufficient. In the case of syndiotactic polypropylene, the crystallization rate after addition of the above nucleating agent is not sufficient and, moreover, addition of the nuceating agent results in reduced transparency.

It is known that addition of diamine/monocarboxylic acid condensate to isotactic polypropylene gives improved slip property and anti-blocking property of film.

Japanese Patent Application Kokai (Laid-Open) No. 220268/1994 discloses a composition obtained by adding a diamine/monocarboxylic acid/polybasic acid polycondensate to isotactic polypropylene. It is described in the literature that the composition has improved fluidity and gives a molding of improved heat resistance and impact resistance Isotactic polypropylene, which has a high crystallization rate and good moldability, hardly has a problem of poor mold releasability associated with low crystallization rate. Therefore, the above literature aims at improved fluidity and improved heat resistance and impact resistance of molding.

Meanwhile, syndiotactic polypropylene, although having excellent properties (e.g. excellent transparency, impact resistance and electrical properties), has a low crystallization rate and resulting poor moldability, which is an inherent problem of syndiotactic polypropylene and must be improved when syndiotactic polypropylene subjected to injection molding. (This problem is not present in isotactic polypropylene.)

The object of the present invention is to improve the poor moldability of syndiotactic polypropylene, and provide a molding having good transparency.

SUMMARY OF THE INVENTION

The present inventors made a study in order to solve the above-mentioned problems of the prior art and, as a result, completed the present invention.

The present invention provides a syndiotactic polypropylene resin composition of excellent moldability comprising 100 parts by weight of a syndiotactic polypropylene and 0.001–10 parts by weight of a diamine/monocarboxylic acid condensate and/or a diamine/monocarboxylic acid/polybasic acid polycondensate.

DESCRIPTION OF PREFERRED EMBODIMENTS

The syndiotactic polypropylene used in the present invention includes a propylene homopolymer, a copolymer of propylene and ethylene and/or an α-olefin having 4 or more carbon atoms, and a mixture thereof.

The syndiotactic polypropylene, when it is a propylene homopolymer, is preferably one having a syndiotactic pentad fraction of 0.6 or more, preferably 0.7 or more obtained in the spectrum measurement by $^{13}$C-NMR by dividing the peak intensity assigned to the absorption of rrrr appearing at about 20.2 ppm, with the total absorption intensity of all methyl carbons of polypropylene, using tetramethylsilane as a standard; and when it is a copolymer of propylene and ethylene and/or an α-olefin other than propylene, is preferably one having a value of 0.3 or more, preferably 0.5 or more obtained in the spectrum measurement by $^{13}$C-NMR by dividing the peak intensity assigned to the absorption of rrrr appearing at about 20.2 ppm, with the total absorption intensity of all methyl carbons of copolymer, using tetramethylsilane as a standard.

In the copolymer of propylene and ethylene and/or an α-olefin other than propylene, having a syndiotactic structure, the content of ethylene and/or an α-olefin other than propylene is preferably 0.1–20% by weight, more preferably 0.1–10% by weight based on the copolymer. When the content of ethylene and/or an α-olefin other than propylene is more than 20% by weight, the syndiotactic polypropylene resin composition has reduced rigidity when molded.

As the α-olefin, there is used a straight chain or branched chain α-olefin having 4–20 carbon atoms. Examples thereof are straight chain olefins such as butene-1, pentene-1, hexene-1, heptene-1, octene-1, nonene-1, decene-1, undecene-1, dodecene-1, tridecene-1, pentadecene-1, octadecene-1 and the like; and branched olefins such as 3-methylbutene-1, 4-methylpentene-1, 4,4-dimethylpentene-1 and the like.

The syndiotactic polypropylene can be produced by a known process. It can be produced by (co)polymerization using, for example, a catalyst comprising isopropyl (cyclopentadienyl-fluorenyl)zirconium dichloride and methylaluminoxane (MAO), described in J. A. Ewen, J. Am. Chem. Soc., vol. 110, 6255–6256 (1988) or a catalyst comprising a metallocene compound and methylaluminoxane, described in EP 387690, EP 387691, etc.

In the composition of the present invention, an isotactic polypropylene may be used in addition to the syndiotactic polypropylene. The added isotactic polypropylene may be a propylene homopolymer or a copolymer of propylene and ethylene and/or an α-olefin. The amount of the isotactic polypropylene used is 0.1–100 parts by weight, preferably 1–50 parts by weight, more preferably 5–30 parts by weight per 100 parts by weight of the syndiotactic polypropylene.

Use of the isotactic polypropylene gives a resin composition more improved in rigidity and moldability. The isotactic polypropylene is commercially available.

In the present resin composition, a copolymer of ethylene and an α-olefin (including propylene) or an α-olefin (other than propylene) homopolymer may be used in addition to the syndiotactic polypropylene. The (co)polymer added is particularly preferably an ethylene- α-olefin copolymer obtained by copolymerizing ethylene and an α-olefin having 3–12 carbon atoms at a weight ratio of 40:60 to 95:5 using a homogeneous catalyst, or a homopolymer of an α-olefin having 4 or more carbon atoms. The amount of the (co) polymer used is 0–50% by weight, preferably 0–30% by weight of the total polymers. Use of, in particular, the above copolymer gives improved impact resistance.

The diamine/monocarboxylic acid condensate used in the present composition is generally commercially available. The diamine/monocarboxylic acid/polybasic acid polycondensate is one obtained by a process for the production of high melting point wax, described in, for example, Japanese Patent Application Kokai (Laid-Open) No. 153793/1991.

The diamine is a diamine having 1–10 carbon atoms and includes, for example, ethylenediamine, 1,3-diaminopropane, hexamethylenediamine, p-xylenediamine and isophoronediamine. Of these, ethylenediamine is particularly preferred.

The monocarboxylic acid is a saturated aliphatic monocarboxylic acid or a hydroxymonocarboxylic acid, each having 10 or more carbon atoms, and includes, for example, stearic acid, behenic acid, montanic acid and palmitic acid. Of these, stearic acid or behenic acid is particularly preferred.

In production of the diamine/monocarboxylic acid condensate, the diamine and the monocarboxylic acid are used in such amounts that the carboxyl group of monocarboxylic acid becomes about one equivalent per equivalent of the amino group of diamine. In production of the diamine/monocarboxylic acid/polybasic acid polycondensate, the diamine, the monocarboxylic acid and the polybasic acid are used in such amounts that the total carboxyl group of monocarboxylic acid and polybasic acid becomes about one equivalent per equivalent of the amino group of diamine.

The polybasic acid is preferably an at least dibasic carboxylic acid. Specific examples thereof are aliphatic dicarboxylic acids such as sebacic acid, adipic acid and the like; aromatic dicarboxylic acids such as terephthalic acid and the like; and alicyclic dicarboxylic acids such as cyclohexylsuccinic acid and the like.

The melting point of the diamine/monocarboxylic acid/ polybasic acid polycondesnate can be controlled by appropriately selecting the kind of monocarboxylic acid used, or by varying the amount of polybasic acid used. Use of the diamine/monocarboxylic acid/polybasic acid polycondesnate can give a higher melting point, whereby the effect of the present invention is made higher.

Use of a (poly)condesate of high melting point gives a composition of good mold releasability but tends to show inferior dispersibility in syndiotactic polypropylene. In view of the balance between mold releasability and dispersibility, the melting point of the diamine/monocarboxylic acid condensate or diamine/monocarboxylic acid/polybasic acid polycondensate used in the present invention is preferably 130°–280° C., more preferably 130°–220° C.

The diamine/monocarboxylic acid/polybasic acid polycondensate can have a higher melting point than the diamine/monocarboxylic acid condensate; therefore, the molding thereof hardly shows bleeding of polycondesnate on the molding surface when heated and can be suitably used in medical or food applications where heat sterilization is conducted.

The amount of polybasic acid used is 0.18–1.0 mole per 2 moles of monocarboxylic acid.

The (poly)condesnate used in the present invention can be obtained by when, for example, an ethylenediamine/stearic acid/sebacic acid polycondensate is produced, melting 2 moles of stearic acid and 1 mole of sebacic acid, dropwise adding 2 moles of ethylenediamine thereto, initiating a dehydration reaction at 160° C. in a nitrogen atmosphere, continuing the reaction at 250°–260° C. for 7 hours until an amine value of 5 or less is obtained, and taking out and solidifying the reaction product.

In the reaction, it is advisable that phosphorous acid or hydrogen phosphorous acid is added as a coloring inhibitor. The amine value of the reaction product is 10 or less, preferably 5 or less.

In the present syndiotactic polypropylene resin composition, the amount of the diamine/monocarboxylic acid condensate and/or the diamine/monocarboxylic acid/ polybasic acid polycondensate is 0.001–10 parts by weight, preferably 0.01–5 parts by weight, more preferably 0.05–2 parts by weight per 100 parts by weight of the syndiotactic polypropylene. When the present composition is used in a film, even when the condensate and/or the polycondensate is used in an amount of 0.2 part by weight or more or even 3 parts by weight or more, the resulting composition gives no fish eyes unlike when an ordinary nucleating agent is used, and can give a film of good slip property and low thermal shrinkage.

When the amount of the condensate and/or the polycondensate in the present composition is less than 0.001 part by weight, no sufficient addition effect is obtained. When the amount is more than 10 parts by weight, the dispersibility of the condensate and/or the polycondensate in the syndiotactic polypropylene is inferior and the resulting composition is inferior in rigidity, transparency, etc.

In the present composition, an organic nucleating agent and/or an inorganic nucleating agent is as necessary used in an amount of 0.001–1 part by weight, preferably 0.01–0.5 part by weight per 100 parts by weight of the syndiotactic polypropylene.

Combined use of the condensate and/or the polycondensate with the organic nucleating agent and/or the inorganic nucleating agent gives a composition of even higher moldability (mold releasability).

The organic nulceating agent and/or the inorganic nucleating agent as necessary used in the present composition includes conventional nucleating agents, that is, organic nucleating agents such as sorbitol derivative [e.g. Gelall MD (trade name), a product of New Japan Chemical Co., Ltd.], organic phosphoric acid salt (e.g. NA-21 (trade name), a product of Asahi Denka Kogyo K. K.) and the like; inorganic nucleating agents such as talc, kaolin and the like; and polymeric nucleating agents such as polyvinylcyclohexane and the like.

The method for producing the present composition has no particular restriction, and the present composition can be produced-by a method ordinarily used in mixing a polyolefin and additives, with no modification thereof. The present composition is produced generally by mixing necessary components at a temperature lower than the melting point of the polypropylene using, for example, a Henschel mixer or the like and then conducting melt-mixing using an extruder or the like. In the above mixing, it is possible to add an antioxidant and a stabilizer (e.g. ultraviolet absorbent), both ordinarily used in crystalline isotactic polypropylene.

The present resin composition has even higher transparency than the high transparency of syndiotactic polypropylene and improved moldability. When the present composition is subjected to injection molding, in particular, the hardening rate in the mold is improved and the release of the resulting molding from the mold is improved; thus, the present composition has a remarkably shortened molding cycle.

The present invention is hereinafter described in detail by way of Examples and Comparative Examples. However, the present invention is not restricted thereto.

In the Examples and Comparative Examples, the properties of the syndiotactic polypropylene resin compositions obtained were measured as follows.

(1) Crystallization temperature (Tc)

Using a differential scanning calorimeter, a polypropylene resin composition was melt at 240° C. for 10 minutes; then, the melt composition was cooled at a rate of 30° C./min to give rise to crystallization; the heat generated by crystallization was recorded; and the exothermic peak temperature was taken as the crystallization temperature of the composition.

(2) Melt flow index (MFI: g/10 min)

Measured at 230° C. using a load of 2.16 kg, in accordance with ASTM D 1238.

(3) Mold releasability ($t_{min}$: sec)

A cylindrical molding having one closed end (outside diameter=32 mm, wall thickness=2 mm) was obtained by injection molding using an injection molding machine, under the conditions of resin temperature =280° C. and mold temperature=39° C. The releasability of the resulting molding was expressed by a cooling time $t_{min}$ required up to when the molding became releasable from the mold.

(4) Haze (%)

Measured on a square sheet (50 mm×50 mm) having a thickness of 2 mm in accordance with JIS K 6714.

(5) Tensile yield strength (kg/cm$^2$)

Measured in accordance with ASTM D 638 at 23° C.

(6) Elongation (%)

Measured in accordance with ASTM D 638 at 23° C.

(7) Izod impact strength (notched) (kg.cm/cm)

Measured in accordance with JIS K 7100.

Various components were mixed in a mixer for 5 minutes; the mixture was pelletized using an extruder under the conditions of resin temperature=230° C. and 80 rpm; the pellets were passed through an injection molding machine under the conditions of cylinder temperature =250° C. and mold temperature=40° C., to prepare test pieces of 2 mm in thickness; and they were used for various tests.

EXAMPLE 1

Propylene was bulk-polymerized in the presence of hydrogen using a catalyst comprising diphenylmethylene (cyclopentadienyl)fluorenylzirconium dichloride and methylaluminoxane, in accordance with the process described in Japanese Patent Application Kokai (Laid-Open) No. 274763/1990, whereby was obtained a syndiotactic polypropylene having an MFI of 1.76 g/10 min at 230° C., a syndiotactic pentad fraction of 0.822 and a crystallization temperature Tc of 53° C. (the polypropylene is hereinafter referred to as s-PP). To 100 parts by weight of s-PP were added 0.10 part by weight of Irgafos 168 (an antioxidant, a product of Chiba-Geigy Japan Limited), 0.045 part by weight of Irganox 1010 (an antioxidant, a product of Chiba-Geigy Japan Limited), 0.10 part by weight of calcium stearate (a neutralizing agent) and 0.30 part by weight of an ethylenediamine/stearic acid/sebacic acid plycondensate [Light Amide Series WH 215 (trade name) (hereinafter referred to as WH 215), a product of Kyoeisha Chemical Co., Ltd., melting point=215° C., molecular weight=about 700]. They were mixed using a Henschel mixer and passed through an extruder for pelletization to obtain a syndiotactic polypropylene resin composition. The composition had a crystallization temperature Tc of 68° C., a mold release time of 22 seconds, an MFI of 1.93 g/10 min and a haze of 17%, and had good moldability and excellent transparency. The results are shown in Table 1.

EXAMPLE 2

A syndiotactic polypropylene resin composition was obtained by repeating the procedure of Example 1 except that the amount of WH 215 was changed to 0.05 part by weight. The composition had a crystallization temperature Tc of 63° C. The results are shown in Table 1.

EXAMPLE 3

A syndiotactic polypropylene resin composition was obtained by repeating the procedure of Example 1 except that the amount of WH 215 was changed to 3.00 parts by weight. The composition had a crystallization temperature Tc of 69° C. The results are shown in Table 1.

Comparative Example 1

A syndiotactic polypropylene resin composition was obtained by repeating the procedure of Example 1 except that no WH 215 was used. The composition had a crystallization temperature Tc of 53° C., a mold release time of 65 seconds or more and an MFI of 1.76 g/10 min, and was difficult to mold and unsuited for use in injection molding. The results are shown in Table 1.

EXAMPLE 4

A syndiotactic polypropylene resin composition was obtained by repeating the procedure of Example 1 except that the amount of WH 215 was changed to 0.20 part by weight and 0.20 part by weight of a sorbitol derivative [Gelall MD (trade name), a product of New Japan Chemical Co., Ltd.] was newly added. The composition had a crystallization temperature Tc of 72° C. The results are shown in Table 1.

Comparative Example 2

A syndiotactic polypropylene resin composition was obtained by repeating the procedure of Example 4 except that no WH 215 was used. The composition had a crystallization temperature Tc of 72° C. but inferior mold releasability. The results are shown in Table 1.

EXAMPLE 5

A syndiotactic polypropylene resin composition was obtained by repeating the procedure of Example 1 except that the WH 215 was changed to 0.20 part by weight of an ethylenediamine/stearic acid/sebacic acid plycondensate [Light Amide Series WH 255 (trade name) (hereinafter referred to as WH 255), a product of Kyoeisha Chemical Co., Ltd., melting point=255° C., molecular weight = about 850]. The composition had a crystallization temperature Tc of 69° C., and had good moldability and excellent transparency. The results are shown in Table 1.

EXAMPLE 6

A syndiotactic polypropylene resin composition was obtained by repeating the procedure of Example 5 except that the amount of WH 255 was changed to 0.10 part by weight and 0.10 part by weight of an organic phosphoric acid salt (NA-21, a product of Asahi Denka Kogyo K. K.) was newly added. The composition had a crystallization temperature Tc of 72° C. The results are shown in Table 1.

EXAMPLE 7

A syndiotactic polypropylene resin composition was obtained by repeating the procedure of Example 1 except that the amount of s-PP was changed to 90 parts by weight and 10 parts by weight of an isotactic polypropylene [Noblen J3H-S3000 (trade name), a product of Mitsui Toatsu Chemicals, Inc., MFI=13.0 g/10 min at 230° C.] (the isotactic polypropylene is hereinafter referred to as i-PP) obtained by polymerization using a Solvay type catalyst was newly added. The composition had a crystallization temperature Tc of 81° C. The results are shown in Table 1.

Comparative Example 3

A syndiotactic polypropylene resin composition was obtained by repeating the procedure of Example 7 except that no WH 215 was used. The composition had a crystallization temperature Tc of 81° C. and a mold release time of 43 seconds. The composition showed slight improvement in moldability but had inferior transparency. The results are shown in Table 1.

EXAMPLE 8

A syndiotactic polypropylene resin composition was obtained by repeating the procedure of Example 7 except that the amounts of s-PP and i-PP were changed to 80 parts by weight and 20 parts by weight, respectively. The composition had a crystallization temperature Tc of 87° C. The results are shown in Table 1.

EXAMPLE 9

A syndiotactic polypropylene resin composition was obtained by repeating the procedure of Example 1 except that The WH215 was changed to 0.20 part by weight of an ethylenediamine/stearic acid condensate (ethylenebisstearic acid amide EBS, a product of Lion Corporation, melting point=140° C., molecular weight=592) (the condensate is hereinafter referred to as EBS). The composition had a crystallization temperature Tc of 69° C. The results are shown in Table 1.

a diamine/monocarboxylic acid condensate and/or a diamine/monocarboxylic acid/polybasic acid polycondensate.

2. A syndiotactic polypropylene resin composition according to claim 1, wherein the syndiotactic polypropylene is a syndiotactic propylene homopolymer or a copolymer of propylene and ethylene and/or other olefin, having a syndiotactic structure.

3. A syndiotactic polypropylene resin composition according to claim 1, comprising 100 parts by weight of a syndiotactic polypropylene and 0.001–10 parts by weight of a diamine/monocarboxylic acid/polybasic acid polycondensate.

4. A syndiotactic polypropylene resin composition according to claim 1, wherein the diamine/monocarboxylic acid condensate is an ethylenediamine/stearic acid condensate.

5. A syndiotactic polypropylene resin composition according to claim 1, wherein the diamine/monocarboxylic acid/polybasic acid polycondensate is an ethylenediamine/stearic acid/sebacic acid polycondesate.

6. A syndiotactic polypropylene resin composition according to claim 1, further comprising 0.001–1 part by weight of an organic nucleating agent and/or an inorganic nucleating agent.

7. A syndiotactic polypropylene resin composition comprising 100 parts by weight of a composition of claim 1 and 100 parts by weight or less of an isotactic propylene (co)polymer.

TABLE 1

| Experiment | Resin (parts by weight) sPP | iPP | (Poly)condensation product Kind | Parts by weight | nucleating agent Kind | Parts by weight | mold releasability Tc °C. | $t_{min}$ second | MFI g/10 min. | Haze % | Izod impact strength kg·cm/cm | YS 23° C. kg/cm$^2$ | Elongation % |
|---|---|---|---|---|---|---|---|---|---|---|---|---|---|
| Ex. 1 | 100 | | WH215 | 0.30 | | | 68 | 22 | 1.93 | 17 | 86 | 206 | 292 |
| Ex. 2 | 100 | | WH215 | 0.05 | | | 63 | 26 | 1.85 | 22 | 86 | 209 | 249 |
| Ex. 3 | 100 | | WH215 | 3.00 | | | 69 | 20 | 1.98 | 31 | 85 | 208 | 299 |
| Com. Ex. 1 | 100 | | | | | | 53 | 65< | 1.76 | 26 | 86 | 209 | 108 |
| Ex. 4 | 100 | | WH215 | 0.20 | Gelall | 0.20 | 72 | 19 | 1.91 | 20 | 92 | 274 | 246 |
| Comp. Ex. 2 | 100 | | | | Gelall | 0.20 | 72 | 47 | 1.78 | 28 | 89 | 210 | 267 |
| Ex. 5 | 100 | | WH255 | 0.20 | | | 69 | 20 | 1.76 | 17 | 89 | 212 | 276 |
| Ex. 6 | 100 | | WH255 | 0.10 | NA-21 | 0.10 | 72 | 15 | 1.79 | 15 | 93 | 278 | 223 |
| Ex. 7 | 90 | 10 | WH215 | 0.30 | | | 81 | 12 | 1.99 | 22 | 95 | 296 | 235 |
| Comp. Ex. 3 | 90 | 10 | | | | | 81 | 43 | 2.01 | 32 | 91 | 230 | 117 |
| Ex. 8 | 80 | 20 | WH215 | 0.30 | | | 87 | 10 | 1.99 | 23 | 97 | 299 | 229 |
| Ex. 9 | 100 | | EBS | 0.20 | | | 69 | 23 | 1.87 | 16 | 87 | 210 | 290 |

What we claim is:

1. A syndiotactic polypropylene resin composition of excellent moldability comprising 100 parts by weight of a syndiotactic polypropylene and 0.001–10 parts by weight of

* * * * *